Feb. 20, 1951 G. HECHT 2,542,672

COORDINATE SELECTING AND LOCKOUT CIRCUIT

Filed Oct. 27, 1948 2 Sheets-Sheet 1

INVENTOR
G. HECHT
BY J W Schmied
ATTORNEY

INVENTOR
G. HECHT
BY J W Schmied
ATTORNEY

Patented Feb. 20, 1951 2,542,672

UNITED STATES PATENT OFFICE 2,542,672

COORDINATE SELECTING AND LOCKOUT CIRCUIT

George Hecht, Astoria, N. Y., assignor to Bell Telephone Laboratories, Incorporated, New York, N. Y., a corporation of New York Application October 27, 1948, Serial No. 56,891

1 Claim. (Cl. 179—18)

Figure 1:
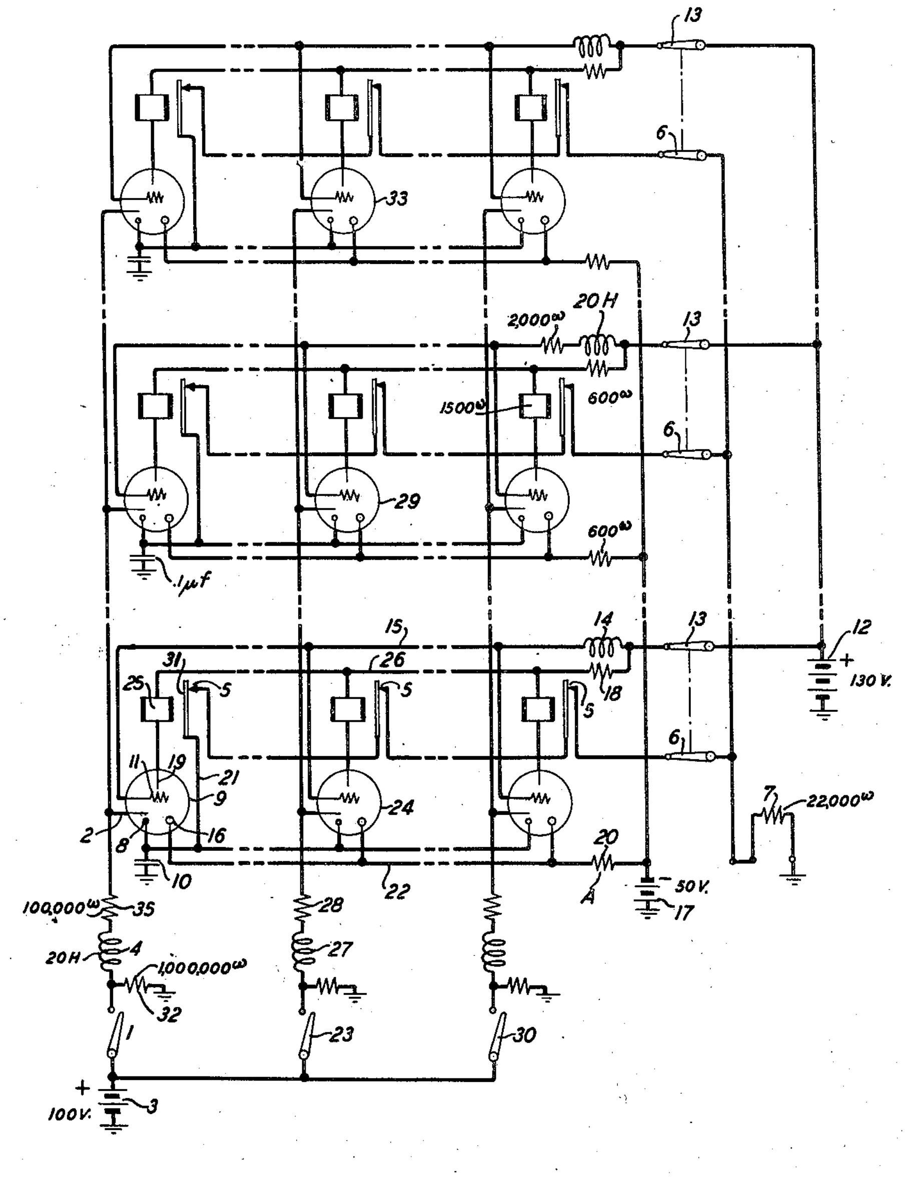

This invention relates generally to improvements of lock-out control circuits and more specifically it relates to improvements of lock-out control circuits for coordinate switching arrangements employing cold cathode, gas-filled tubes.

An object of the invention is to provide arrangements for interconnecting one of a first group of circuits to one of a second group of circuits with a reliability and accuracy heretofore unknown in the art.

A further object of the invention is an arrangement whereby no two or more circuits of one of the said groups of circuits are connected to the same circuit of the other of said groups of circuits at any one time.

Another object of the invention is an arrangement whereby if two or more circuits of the first group of circuits are simultaneously required to be connected to one of the circuits of said second group of circuits, the said two or more circuits shall not become connected to the same circuit of said second group of circuits.

This invention is an improvement upon the lock-out circuit disclosed in a copending application for patent by E. Bruce, Serial No. 42,354, filed August 4, 1948, which discloses a lock-out control circuit utilizing four electrode cold cathode gas tubes arranged in coordinate fashion. In said Bruce application the control cathodes in a horizontal row, the control anodes in a vertical column, and the main anodes in a horizontal row, are all connected in multiple; lockout may first occur in a vertical column and then subsequently occur in a horizontal row, the tube becoming ionized in the main discharge path being common to both the horizontal row and the vertical column; each of the aforesaid connections in multiple has an impedance common to all the electrodes in a particular multiple connection.

For purposes of clarity the coordinates will be designated as horizontal rows and vertical columns. It is a characteristic of gas tube lock-out control circuits that if a column or row has impedances individual to and in series with each gas tube in that column or row, and such individual impedances are in the circuit in which lockout occurs, then such individual impedances will oppose lockout since they will then to allow current to flow to each (all) of the lock-out circuits instead of only one and will consume voltage that would otherwise be applied across said ionizing gas tube or tubes.

Consequently, there is less probability of the lock-out circuit failing, i. e. of two or more of the first group of circuits becoming connected to one of the second group of circuits, or two or more of the second group of circuits becming connected to one of the first group, if the gas tubes of a row or column have no individual impedances in their respective lock-out circuits. The prior Bruce application referred to, supra, disclose such impedances individual to each gas tube in a column.

The present invention embodies improvements whereby the probability of operational failure from such reasons as discussed supra are considerably less than has been known heretofore. Here there are no impedances individual to each gas tube of a column or row in the circuits in which lockout occurs.

In accordance with an exemplary embodiment of this invention of five-element gas discharge tube is employed, having a screen or grid shielding the main anode and arranged so that a discharge must be first initiated to the screen before it can be transferred to the main anode. This tube is employed in a multiple or coordinate lock-out circuit such that only one path will be completed from one circuit of a first group of circuits to a circuit of a second group of circuits. The tubes and circuits are arranged such that certain elements of the tubes are arranged in one coordinate pattern with a common impedance connected to one of the electrodes of one of the discharge paths of the tubes, and other electrodes including the screens, control cathodes and main cathodes are arranged in accordance with another coordinate pattern having common impedances in other discharge paths within the tube.

A feature of the invention is its adaptability as a connector circuit by which devices, such as senders, may be connected to other devices, such as markers in such a manner that only one sender will be connected to one marker. From a generic aspect of the invention groups of circuits or devices other than senders and markers may be interconnected uniquely in pairs by the use of lock-out circuits involving the principles of the exemplary embodiment herein disclosed.

Figure 2:
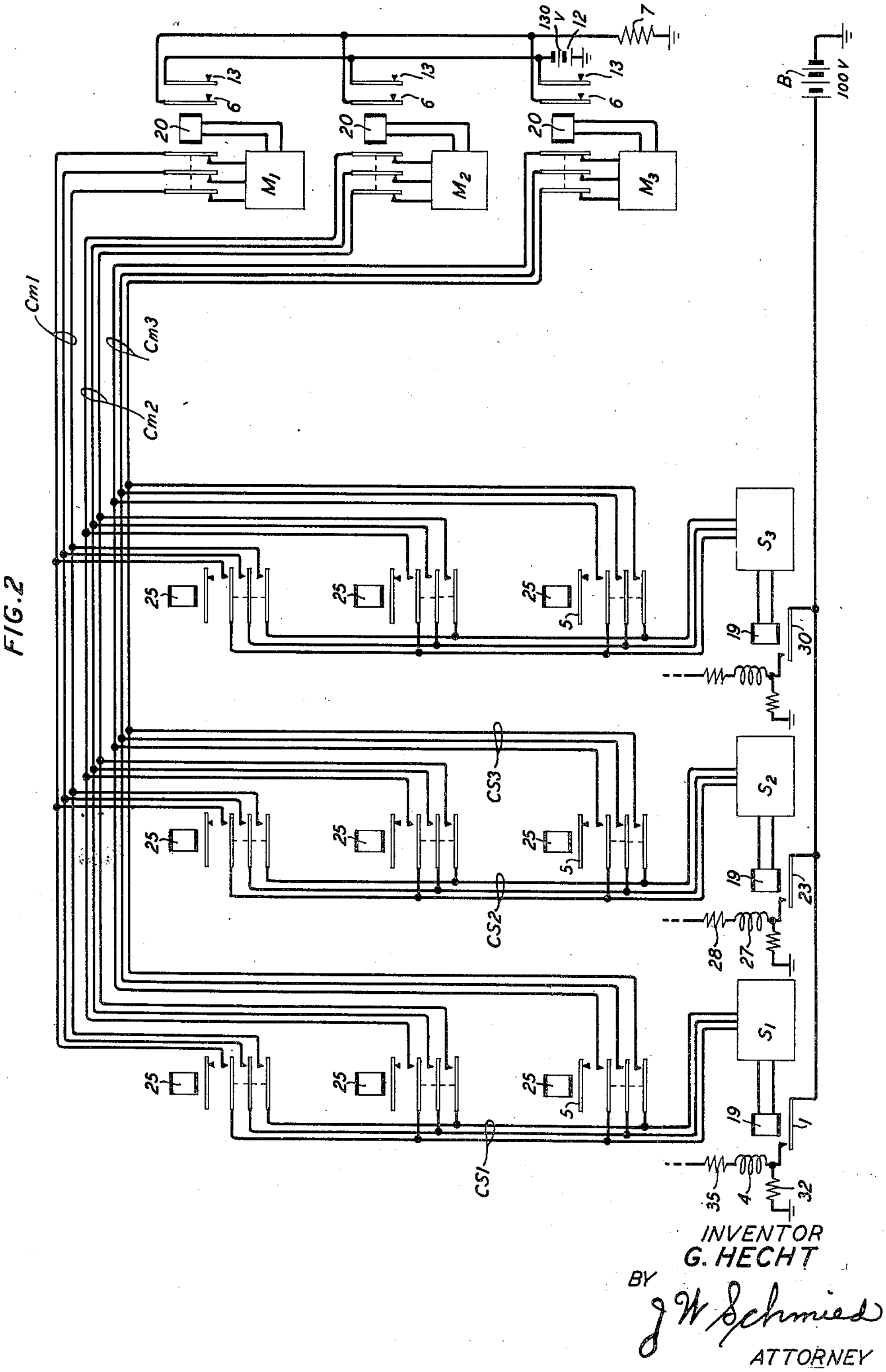

The invention, its nature and objects, may be more fully understood from the following description of the drawings wherein:

Fig. 1 represents the arrangement of the gas-filled tubes and associated relays in a preferred embodiment of the invention; and Fig. 2 illustrates how the lock-out circuit may be utilized in connecting senders to markers.

In Fig. 1 the cold cathode gas tubes such as tubes 9, 24, 29, etc., have five electrodes. Electrodes 2 and 8 are the control anode and control cathode respectively and are utilized, among other purposes, for establishing an initial ionization within the tube. More commonly they are designated starting electrodes. The screen grid 11 envelops the main anode 19 to insure lockout before the main anode 19 acts as an electrode for a discharge. Electrode 16 is the main cathode of the gas tube. The tube in the preferred embodiment of the invention, may be argon filled since argon has superior lock-out characteristics, but other suitable gases, including neon, krypton, hydrogen, metallic vapors, etc., may be used. Construction of the tube must be such that when used in conjunction with suitable applied potentials the control anode control cathode gap ionizes first and the first transfer is from the control anode to the screen grid. A tube of this general type is disclosed in Depp, United States Patent 2,340,799 dated February 2, 1944; according to this invention any tube equivalent in function may be employed.

In the preferred arrangement the following circuit constants should have approximately the following values: battery 3 about 100 volts; inductances 4, 27, etc., about 20 henries; resistances 5, 28, etc., about 100,000 ohms; capacitance 10 etc., about .1 microfarad; resistance of relay 25, etc., about 1500 ohms; resistances 32, etc., about 1,000,000 ohms; resistances 20, etc., about 600 ohms; resistances 18, etc., about 600 ohms; inductances 14, etc., about 20 henries, resistance 7 about 22,000 ohms, battery 17 about 50 volts; and battery 12 about 130 volts.

The operation of the invention will now be described in detail. In the interests of clarity the operation of Figs. 1 and 2 will be taken up separately.

In Fig. 1 switch 1 is closed by an external means such as a sender. Thereupon battery 3 places positive 100 volts upon control anode 2 through inductance 4 and resistance 35. Ground is already on control cathode 8 by virtue of a circuit extending from ground through resistance 7, contact 6, a chain of contacts 5, to control cathode 8. The control gap of this type of gas tube will ionize at this voltage. Since all the tubes in a vertical column have this voltage applied across their control gaps, there would normally be a probability of more than one of the tubes in the vertical columns ionizing. However, inductance 4 and resistance 35 act in a manner well known in the prior art to reduce this probability to a very small value. Thus only one of the gas tubes in the vertical row will have its control gap ionized. Assume that tube 9 is that one. Condenser 10 has acted to keep the potential of control cathode 8 at ground during the ionizing period. Towards the end of the impulse, a matter of a few milliseconds, condenser 10 will no longer serve this purpose and the potential of control cathode 8 will become positive due to the current flow therethrough and a resultant voltage drop across resistance 7. The first transfer within the tube takes place between control cathode 8 and screen grid 11 which immediately before this ionization occurs has a potential of positive 130 volts from battery 12, contact 13, inductance 14, lead 15, to screen grid 11. After this transfer occurs, the tube is ready for a transfer from the screen grid to the main cathode 16 since the main cathode has a negative 50 volts from battery 17 impressed thereon and control cathode 8 is positive. In the type of gas tube utilized in this exemplary embodiment of the invention the screen grid 11 surrounds the main anode and until an arc is first established with the screen grid as an electrode, an arc will not be established with the main anode as an electrode because the screen grid and the main anode are at the same potential when neither is acting as an electrode. Therefore there is a discharge, at this point in time, from screen grid 11 to main cathode 16, hence the main anode 19 becomes capable of acting as an electrode for an arc. The transient current flowing through the screen grid circuit and inductance 14 produces a potential drop across inductance 14 which places screen grid 11 at a lower potential than main anode 19 thus permitting a transfer of the discharge to the space between main anode 19 and main cathode 16. It will be noted that the screen grids, the control cathodes, and the main cathodes in any one horizontal row are connected in multiple which is the best condition for lockout. This results in a double lockout in the horizontal rows; the first being in the screen grid 11 and control cathode 8 circuit with inductance 14 and resistance 7 constituting the impedance common to all such circuits in this horizontal row, the second being in the screen grid 11 and main cathode 16 circuit with inductance 14 and resistance 20 constituting the common impedance to all such circuits in the horizontal row.

The first of the two lock-out circuits discussed supra, e. g. the lock-out circuit involving the screen grid 11 and the control cathode 8, extends from positive battery 12, contact 13, common impedance 14, conductor 15, screen grid 11, the space gap to control cathode 8, conductor 21, the chain of contacts 5, switch 6, common resistance 7, to ground. The second of the two lock-out circuits, e. g. the lock-out circuit involving the screen grid 11 and the main cathode, extends from positive battery 12, switch 13, common inductance 14, conductor 15, screen grid 11, the space gap to main cathode 16, conductor 22, common resistance 20, to negative battery 17. An important feature of these two lock-out paths lies in the fact that neither has impedances which are individual to each gas tube in any one horizontal row.

It is to be understood that the above description is applicable to each row of tubes should that row be chosen by the vertical lock-out circuit.

Up to this point little mention has been made of the usefulness and operation of the two lock-out circuits existing in any horizontal row. This will now be discussed.

Assume that two senders simultaneously require to be connected to a marker. Although two or more senders can be simultaneously connected to different markers only one sender can be connected to the same marker at the same time, so it becomes essential that no two or more tubes, corresponding to two or more senders, in one horizontal row become completely ionized at one time.

A different horizontal row must be selected for each sender since there is only one marker available for each row. If two senders close switches 1 and 23 simultaneously, there will be a possibility that the vertical lock-out circuits heretofore described will operate to choose a tube in the same horizontal row for both senders. Assume that this occurs and that the control anode to control cathode space gap is ionized in both tube 9 and tube 24. As explained prior, the discharges within the tubes will next attempt to effect a transfer to the space gap between control cathode 8 and screen grid 11 of the tubes. It is at this point that the first of the two lock-out circuits operates. Both the control cathodes and the screen grids of the tubes in this horizontal row are connected in multiple and inductance 14 and resistance 3 constitute the common impedance which prevents the aforementioned transfer in all but one of the tubes in this horizontal row in a manner well known in the prior art. Should the rare possibility occur that a transfer to the screen in two or more tubes is effected, there will still be another opportunity for lockout to occur. As explained prior, the arcs within the two tubes will next attempt to transfer to the space gap between the main cathode 16 and the screen grid 11 as electrodes. Since both the screen grids and the main cathodes in a horizontal row are connected in multiple and there is a common impedance, inductance 14 and resistance 20, lockout of all but one of the gas tubes will almost certainly occur. The final transfer of the arc in the selected tube now takes place between the main cathode 16 and the main anode 19 to operate relay 25 in a circuit extending from positive battery 12, switch 13, resistance 18, conductor 26, relay 25, main anode 19, through the space gap to main cathode 16, conductor 22, resistance 20, to negative battery 17. Operation of relay 25 opens contact 5 of said relay. Opening of contact 5 will extinguish any discharge existing between the control cathode and control anode of any tube or tubes in this horizontal row of tubes inasmuch as contact 5 forms a part of such circuit.

It is important that these discharges be extinguished inasmuch as no sender, becoming connected to a vertical row in which there is a discharge at the time of such connection between the control anode and control cathode of a tube 24 for example, can become connected to a marker during such discharge since none of the tubes in said vertical row can become completely ionized due to the fact that the discharge between the control anode and control cathode of tube 24 has lowered the difference of potential of the corresponding space gaps of all other tubes in the same vertical column to a point below the breakdown value of said space gap. The lowering of said difference of potential would be caused by the flow of the discharge current through resistance 28 and resistance 7.

But since contact 5 is opened, all the vertical columns, other than those in use, are available to senders connected thereto. It is to be noted however, that no tube, in the same horizontal row as a fully ionized tube, can have a discharge created between its starting cathode and starting anode because the circuit therefore is opened when contact 5 is opened.

Consequently if a second sender should now close switch 23, tube 24 could not be ionized. But either tube 29 or tube 33 could be ionized. As described before either, but not both, tube 29 or tube 33 will ionize due to the lock-out effect of resistance 28 and inductance 27. When a tube has completed its function and has been extinguished by the opening of a switch such as 13, relay 25 will be deenergized and contact 5 will close thus placing the corresponding horizontal and vertical coordinates again in normal condition.

Attention is now directed to Fig. 2 wherein the invention is applied to telephone circuits to connect senders to markers. The switches 1, 23, and 30 of Fig. 1 now are the armatures of relays 19 and associated contacts of Fig. 2. Switches 13 and 6 of Fig. 1 are now armatures of relays 20 and associated switches. It may be assumed that each relay 19 is associated with a sender S1, S2, S3, etc., and that each relay 19 is controlled by its associated sender so that the relay is energized to close its contacts whenever the sender requires to be connected to a marker. A series of markers are designated M1, M2, M3, etc., and each marker has associated therewith a relay 20 which is released when the marker is idle and available, and is operated as soon as the marker is seized, remaining operated until the marker has performed its function in the telephone system whereupon it again becomes released. Incident to the release of relay 20, it closes two back contacts which correspond respectively to the switches 6 and 13 of Fig. 1. It is understood that switches 6 and 13 (or armatures 6 and 13) close when relay 20 is deenergized. The tubes shown in Fig. 1 are not shown in Fig. 2 but their associated relays such as relay 25 with armatures such as armature 31 are shown and it is to be understood that this array of tubes is associated with batteries and relays as shown in Fig. 1.

In the telephone art the number of leads by which a sender requires to be connected to a marker is known for each type of telephone system but may vary somewhat dependent upon the type of system. This variance may be quite considerable. The exact number is not of primary consequence to this invention which is capable of associating a sender with a marker by any number of conductive leads within reasonable limits, for example, any desired number between 1 and 100. It will be seen that such a system of conductors designated Cs1 extends from each sender S1 and a similar system Cs2 extends from a similar sender S2, etc. These conductors all terminate on sets of armatures on the column of relay 25. It will be seen that each marker has extended therefrom a corresponding set of conductors and that when any one relay 25 associated with any particular marker is closed, this set of conductors is extended through to the marker. Thus the conductors Cm1 extend from the marker M1 to the upper row of front contacts of relays 25, the conductors Cm2 extend to the second row, etc. It will be seen by extending the array that there may be any reasonable number of senders and any reasonable number of markers. Let it now be considered that when any particular marker $M_1$, $M_2$, etc., is idle its associated relay 20 is released and that when any particular sender $S_1$, $S_2$, etc., requires connection to a marker its relay 19 becomes energized. It has already been shown by reference to Fig. 1 that only one relay 25 in a column can become energized at the same time and that only one relay 25 in a row may become energized at the same time. In consequence of this, each sender, when it requires a marker, is connected to one marker and one marker only.

The sender may be connected to the marker for such time and over such leads as is necessary to transfer whatever information is necessary or desirable from the sender to the marker and/or vice versa and to exercise the necessary intercontrol at which time the connection of the sender to the marker is no longer necessary. The marker causes relay 20 to be energized and coincidently causes release of the relay 19 which established the connection to thereby open its contact 1 if the first column is the one involved. These functions are accomplished by interconnecting relay and circuit means of a nature well understood in the art. The tube T which established this particular connection extinguishes upon the opening of contacts 6 and 13, but it is to be noted that contact 5 remains opened however, by virtue of certain control circuits not shown in the drawings, until after contact 1 has been opened, to avoid the possibility of the sender causing ionization of another tube. Thereafter, this marker maintains its relay 20 operated and remains busy until it has performed all its intended functions. Immediately after completion of its functions the marker causes its associated relay 20 to release. The marker is now again restored to an "available" condition because contacts 6 and 13 are closed, and all tubes of its row are extinguished. Consequently, if a sender $S_1$ has been connected with a connector $M_1$ and thereafter requires connection to another marker before marker $M_1$ is idle, sender $S_1$ will become connected with some other marker such as $M_2$ or $M_3$ assuming that some other one is idle. If none is idle the sender will have to wait as will be seen by reference to Fig. 1 because unless and until the pair of circuit establishing elements 6 and 13 are closed there will be no circuit by which closure of contact 1 of the first column or the corresponding contacts of other columns can initiate a discharge in any tube of its associated column. It will become apparent that if the markers require more time than the senders to perform their respective functions, it might be necessary to provide a number of markers greater than the number of senders.

In a broad aspect the invention is not limited to interconnection of senders with markers. It could equally well be employed in analogous manner for the interconnection over a suitable number of conductors from any one of a series of units with any one of a series of other units so that each connection during its existence is unique. The necessity for separate sequencing or allotting circuits or their equivalents are avoided. In other words, the elements of one series such as the senders $S_1$, $S_2$, etc., may close their respective contacts calling for connection with an element of the other series of devices such as the markers $M_1$, $M_2$, etc., in any order and at any time. It is observed that the relays 25 are indicated as multicontact relays. If the number of conductors required to be extended is too great, a plurality of relays 25 may be arranged with their windings in series or multiple to perform the desired function or each relay 25 may control one or more other relays whereby the desired number of conductors may be extended.

In discussing probabilities herein it is to be understood that reference is made to exceedingly small probabilities; so small in fact that difficulty is encountered in their experimental determination. Although it is difficult to determine a definite figure for the probability of double connections with a properly designed lock-out circuit of the type of the Bruce application, if we should assume a failure probability of $1/n$ (where $n$ is a large positive integer) the application of the principles of the present invention may further reduce this probability by some factor of the order of $1/10^3$ to $1/10^6$.

It is to be understood that the above disclosure is exemplary rather than limiting. The scope of the invention is defined by the subjoined claim.

What is claimed is:

An array of tubes coordinately arranged in rows and columns, each tube containing five electrodes, a first group of circuits, one individual to each column, a second group of circuits, one individual to each row, a first impedance common to a first electrode of all tubes in a column, one such impedance for each column, means for initiating a discharge between one of said first electrodes and a second electrode of a tube in a given column, said common impedance limiting said discharge to only one tube in said column, means for transferring said discharge to the space gap between said second electrode and a third electrode, a second impedance common to all said third electrodes in a given row, said second impedance limiting said transfer to only one tube in said row, means for transferring said discharge to the space gap between said third electrode and a fourth electrode, said second impedance limiting said last-mentioned transfer to only one tube in a row, means for transferring said discharge to the space gap between said fourth electrode and a fifth electrode, and means responsive thereto to connect one of said first group of circuits to one of said second group of circuits.

GEORGE HECHT.

REFERENCES CITED

The following references are of record in the file of this patent:

UNITED STATES PATENTS

| Number | Name | Date |
|---|---|---|
| 2,291,036 | Hall | July 28, 1942 |
| 2,291,040 | Holden | July 28, 1942 |
| 2,291,224 | Hall | July 28, 1942 |
| 2,291,752 | Parker | Aug. 4, 1942 |
| 2,326,551 | Mohr | Aug. 10, 1943 |
| 2,348,626 | Holden | May 9, 1944 |
| 2,350,888 | Hall | June 6, 1944 |